United States Patent
Heng

(10) Patent No.: US 12,235,883 B2
(45) Date of Patent: Feb. 25, 2025

(54) METHOD AND COMPUTING DEVICE IN WHICH SEMANTIC DEFINITIONS ARE COMPOSED AS A SEMANTIC METASET

(71) Applicant: ZRO Inc., Fukuoka (JP)

(72) Inventor: Tio Seng Heng, Kobe (JP)

(73) Assignee: ZRO Inc., Kobe (JP)

( * ) Notice: Subject to any disclaimer, the term of this patent is extended or adjusted under 35 U.S.C. 154(b) by 259 days.

(21) Appl. No.: 17/886,486

(22) Filed: Aug. 12, 2022

(65) Prior Publication Data

US 2023/0069957 A1  Mar. 9, 2023

(30) Foreign Application Priority Data

Aug. 20, 2021 (JP) ................. 2021-134904

(51) Int. Cl.
| | |
|---|---|
| *G06F 16/338* | (2019.01) |
| *G06F 16/31* | (2019.01) |
| *G06F 16/35* | (2019.01) |
| *G06F 16/353* | (2025.01) |
| *G06F 40/242* | (2020.01) |
| *G06F 40/30* | (2020.01) |
| *G06F 40/40* | (2020.01) |

(52) U.S. Cl.
CPC .......... *G06F 16/338* (2019.01); *G06F 16/316* (2019.01); *G06F 16/353* (2019.01); *G06F 40/242* (2020.01); *G06F 40/30* (2020.01); *G06F 40/40* (2020.01)

(58) Field of Classification Search
CPC .... G06F 16/338; G06F 16/353; G06F 16/316; G06F 40/30; G06F 40/40; G06F 40/242
See application file for complete search history.

(56) References Cited

U.S. PATENT DOCUMENTS

| | | | |
|---|---|---|---|
| 2011/0276581 A1 | 11/2011 | Zelevinsky | |
| 2012/0010870 A1* | 1/2012 | Selegey | ............... G06F 40/242 704/E11.001 |
| 2015/0026101 A1 | 1/2015 | Lin et al. | |
| 2021/0357646 A1 | 11/2021 | Heng | |

FOREIGN PATENT DOCUMENTS

| | | |
|---|---|---|
| JP | H05174066 A | 7/1993 |
| JP | 6830514 | 2/2021 |
| JP | 2021022161 A | 2/2021 |
| WO | 2015175736 | 11/2015 |
| WO | 202120307 A1 | 2/2021 |

OTHER PUBLICATIONS

Extended European Search Report, Jan. 12, 2023, Application No. 22191008.6-1203, Berlin.

* cited by examiner

*Primary Examiner* — Bhavesh M Mehta
*Assistant Examiner* — Edward Tracy, Jr.
(74) *Attorney, Agent, or Firm* — Sonoda & Kobayashi Intellectual Property Law; Sarvajit S. Patil

(57) ABSTRACT

The present application discloses a method of representing semantic definitions on a computing device. Semantic definition statements are composed using operators. The semantic definition statements include semantic concept statements using semantic concept operators and semantic context statements using semantic context operators. The semantic definition statements are saved in a metaset. The metaset is converted into a digital data structure and stored in a memory storage device of a computing device. The present application further discloses a method of semantically searching for a visual using a metaset.

28 Claims, 7 Drawing Sheets

METHOD AND COMPUTING DEVICE IN WHICH SEMANTIC DEFINITIONS ARE COMPOSED AS A SEMANTIC METASET

FIELD OF THE INVENTION

The invention relates to the field of semantic definitions. More particularly, the invention relates to representing semantic definitions in a computing device as semantic metadata for use in semantic processing and configurable semantic search.

BACKGROUND OF THE INVENTION

An object can be described by its visual semantic attributes and non-visual semantic attributes, where relationships between the semantic attributes are determined based on definitions provided in databases during steps of visual processing, as described in Japan Patent No. 6830514. For example, if an object depicts a lemon, a database may provide semantic relationships between "lemon" and semantic attributes such as "citrus fruit", "sour", "vitamin C," and "edible."

Given the extremely large number of semantic attributes and the complexity of various types of relationships between semantic attributes that may exist across even a small set of objects, there are many challenges in representing these semantic attributes and relationships as semantic definitions on computing devices. Accordingly, there is a need in the art for improved methods and data structures for representing semantic definitions. Further, there is a need in the art for efficiently creating, editing, searching, and querying databases of semantic definitions.

SUMMARY OF THE INVENTION

The present application discloses a method of representing semantic definitions on a computing device. Semantic definition statements are composed using operators. The semantic definition statements include semantic concept statements using semantic concept operators and semantic context statements using semantic context operators. The semantic definition statements are saved in a metaset. The metaset is converted into a digital data structure and stored in a memory storage device of a computing device.

The semantic definition statements may also include operators for semantic marker statements, semantic marker collection statements, semantic realm statements, semantic inheritance statements, semantic instance statements, lexical function statements, semantic internationalization statements, or semantic references.

The present application further discloses a method of semantically searching for a visual. Input is received via a computer interface, and semantic expressions are derived from the input. Types of semantic definitions are determined to be applied to a search. The types of semantic definitions may include semantic element definitions, semantic concept definitions, semantic context definitions, semantic marker definitions, semantic realm definitions, semantic instance definitions, semantic inheritance definitions, semantic internationalization definitions, lexical functions definitions, or semantic reference definitions. Metasets having semantic definition statements representing semantic definitions may also be applied to the search. The search is performed based on the input and the determined types of semantic definitions, as well as any selected metasets. A list of visuals determined to have semantic relevance to the input based on the search is output.

The present application further discloses a method of selecting semantic definitions from a metaset. Semantic definition statements representing semantic definitions are retrieved from metasets. Each semantic definition statement includes a subject operand, an operator, and at least one object operand. A set of semantic expressions based on the semantic definition statements is output. The semantic expressions have selectable items corresponding to the operand(s). A selection of the selectable items is received. Selected semantic definitions are determined based on the set of semantic expressions and the selection of the selectable items. Selecting semantic definitions from a metaset may be used for metaset navigation or metaset filtering.

Composing, editing, querying, saving, searching, or otherwise interacting with a metaset may be performed using a semantic definition management editor.

The methods disclosed in this application may be stored on a non-transitory computer readable medium as instructions executable by a processor.

DETAILED DESCRIPTION OF THE INVENTION

Figure 1:
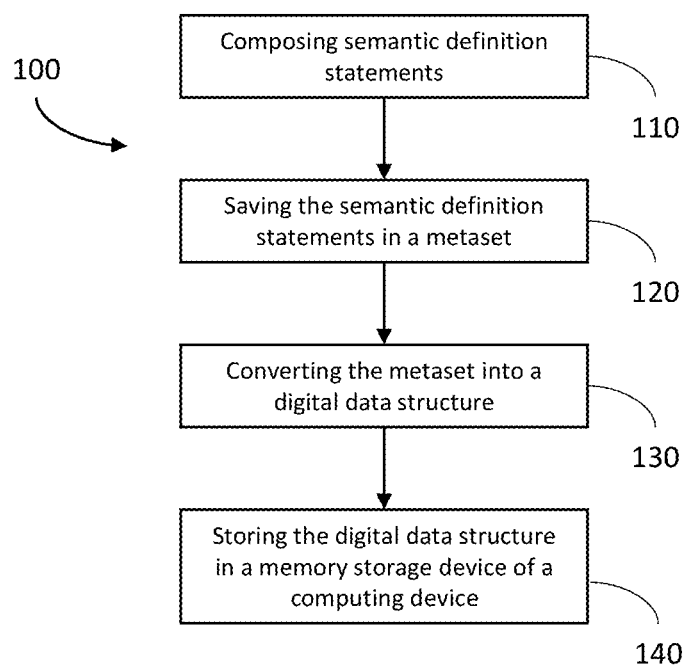
FIG. 1 is a block diagram illustrating a method of representing semantic definitions on a computing device according to an embodiment of the present invention.

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a variety of different configurations, all of which are explicitly contemplated herein.

FIG. 1 illustrates a method of representing semantic definitions on a computing device 100 according to an embodiment of the present invention. Representing semantic definitions according to method of representing semantic definitions on a computing device 100 has several technical advantages over the prior art. Metasets provide an efficient data structure for representing semantic attributes and the relationships between the various semantic attributes. Metasets can be easily stored and accessed for a wide variety of functions, including visual definition processing, editing, querying, filtering, navigation, and search.

The representations of semantic definitions as semantic definition statements may be configured to strictly follow and implement the precise semantic definitions described in Japan Patent No. 6830514. The design and implementation of metasets and semantic definition statements is flexible (semantic definitions can be represented across unlimited knowledge domains), extensible (various semantic definitions in Japan Patent No. 6830514 can be implemented along with new definitions such as semantic references, semantic internationalization, and further not-yet-specified definitions without any limitation), and personalized/specialized/democratized (knowledge can be expressed in semantic definitions differently by experts/individual via metasets with references to sources of knowledge).

Figure 2:
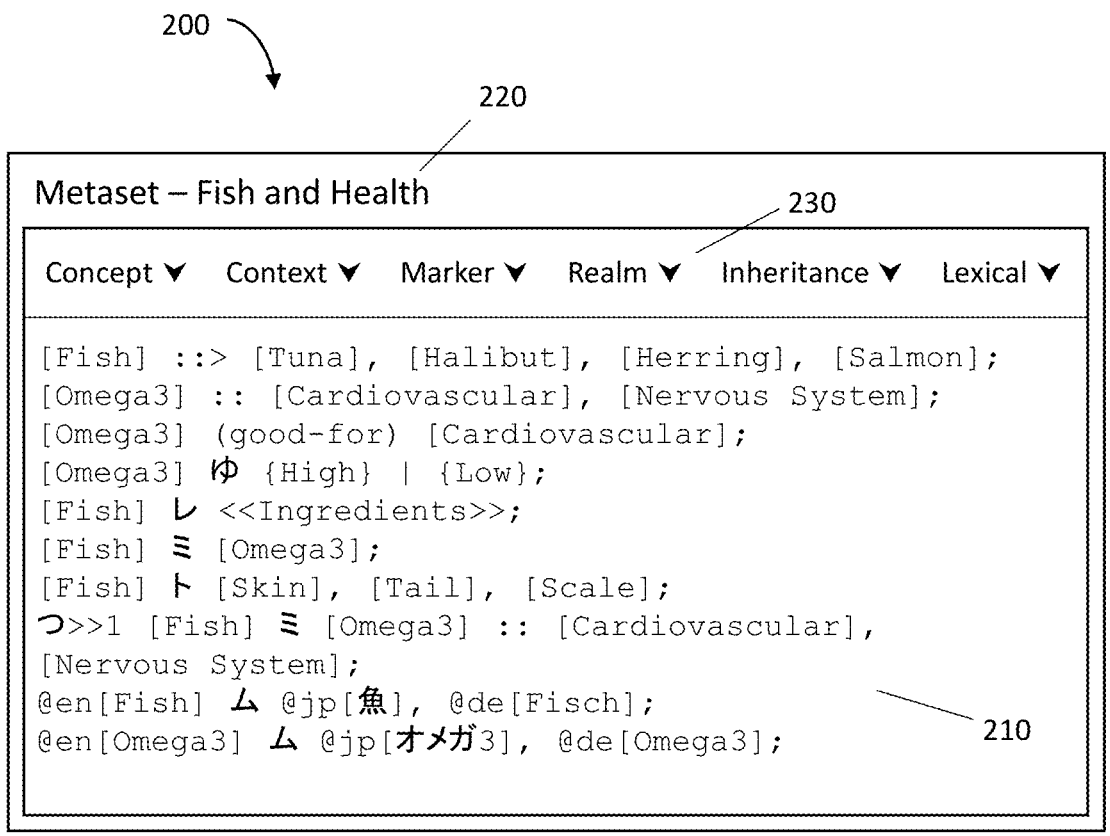
FIG. 2 is a diagram illustrating a semantic definition management editor according to an embodiment of the present invention.

In step 110, semantic definition statements are composed. The semantic definition statements represent semantic definitions, which describe semantic attributes and their relationships. The semantic definition statements may represent various types of semantic definitions described in Japan Patent No. 6830514, including but not limited to semantic element, semantic concept, semantic context, semantic marker, semantic realm, semantic inheritance, semantic instance, and lexical function. The semantic definition statements may further represent semantic internationalization and semantic references (described below). The semantic definition statements may further represent non-yet-specified semantic definitions. Semantic definitions may be composed in a semantic definition management editor, as seen in FIG. 2. Alternatively, semantic definitions may be composed in any program capable of text editing.

Semantic definition statements are constructed using operators and operands. Semantic definition statements generally include a subject operand, an operator, and an object operand. Some semantic definitions may include multiple subject operands, multiple operators, or multiple object operands. Subject operands, operators, and object operands may appear in any order. In one embodiment, the left-to-right order is subject operands, operators, and object operands. Operands may be words, and the operators may be symbols and/or alphanumeric. Semantic definition statements can be composed in any language or character set, including those of double-byte languages such as Japanese. Each semantic definition statement may end with a semicolon or another character to indicate the end of the statement.

A semantic element is the most basic component of a semantic definition statement. Semantic elements may be visual or non-visual semantic attributes. A semantic element statement may include a semantic element operator indicating that a block of text is defined as a semantic element. In an exemplary embodiment, two square brackets are a semantic element operator defining the text within the brackets as a semantic element, such as "[Grape]". A semantic element may also refer generally to any individual element of a semantic definition statement, such as a semantic concept, a semantic realm, a semantic instance, etc.

A semantic concept is a general notion, taxonomy, or hierarchical structure that expresses a semantic relationship. A semantic concept statement expresses a semantic concept relationship through a semantic element representing the semantic concept as a subject operand, a semantic concept operator, and one or more semantic elements that are object operands. In an exemplary embodiment, a general semantic concept statement may have the form "[A]::[B], [C], [D];", where "::" is a general semantic concept operator and object operands are separated by commas. For example, "[Berry]::[Grape], [Raspberry], [Blueberry];" is a general semantic concept statement in which "Berry" is defined as a semantic concept with semantic element members "Grape", "Raspberry", and "Blueberry".

Other semantic concept operators may be used instead of the general semantic concept operator to define a specific type of semantic concept relationship. A semantic concept relationship in a hierarchical structure describing a "type of" relationship, an "is a" relationship, or a taxonomical structure is defined as a hypernym/hyponym relationship. In an exemplary embodiment, "::>" is a hypernym operator, and "<::" is a hyponym operator. For example, "[Fruit]::>[Grape], [Orange], [Mango];" may be a hypernym semantic concept statement, and "[Grape], [Raspberry], [Blueberry]<::[Berry];" may be a hyponym semantic concept statement.

A semantic concept relationship in a hierarchical structure describing a whole/part relationship is defined as a holonym/meronym relationship. In an exemplary embodiment "⊢" is a holonym operator, and "∃" is a meronym operator. For example, "[Fruit]⊢[Skin], [Flesh], [Seed];" is a holonym semantic concept statement, and "[Root], [Trunk], [Branch], [Bark], [Leaves], [Flower]∃[Tree];" is a meronym semantic concept statement.

A semantic concept relationship in which a precise action word is used to define a general verb is defined as a troponym relationship. In an exemplary embodiment, "//>" and "//<" are troponym operators. For example, "[Cut]/>[Trim], [Slice];", "[Walk]//>[Stroll];", and "[Snack], [Nibble]//<[Eat];" are troponym semantic concept statements.

A specific type of semantic concept relationship not indicated by a pre-defined operator may be indicated using a free semantic concept operator. In an exemplary embodiment, a free semantic concept operator may be a set of double parentheses appended to a semantic concept statement that uses the general semantic concept operator, and the double parentheses may surround a free text description of the semantic concept relationship. For example, "[Anti-Oxidant]::((protect cell membrane from radical damage));" is a free semantic concept statement defining the semantic concept "Anti-Oxidant" as having a semantic concept relationship with the free text "protect cell membrane from radical damage" because anti-oxidants protect cell membranes from radical damage. In another example, "[Anti-Oxidant]::[Vitamin C], [Manganese], ((protect cell membrane from radical damage));" is a free semantic concept statement where "Vitamin C" and "Manganese" have a semantic concept relationship with "Anti-Oxidant" because "Vitamin C" and "Manganese" are anti-oxidants that protect cell membranes from radical damage.

A semantic context defines a semantic relationship between two or more semantic concepts. A semantic context statement expresses a semantic context relationship through at least a first semantic concept as a subject operand, a semantic context operator, and a second semantic concept as an object operand. The semantic context relationship may be further defined using another semantic context operator and one or more semantic elements. In an exemplary embodiment, a semantic context statement may have the form "[A] ∋ [B];" where A and B are semantic concepts and "∋" is a semantic context operator. For example, "[Plants] ∋ [Soil];"

is a semantic context statement defining a semantic context relationship between "Plants" and "Soil". Another semantic context statement may have the form "[A] ⋛ [B]::[C];" where "::" is a second semantic context operator and C is a semantic element describing the semantic context relationship. The second semantic context operator may be the same symbol as the general semantic concept operator. For example, "[Plants]; [Soil]::[Nutrients];" is a semantic context statement defining a semantic context relationship between "Plants" and "Soil" with "Nutrients" as a member of the relationship. In other words, "Plants" and "Soil" are semantic contextually related via "Nutrients".

A specific type of semantic context relationship not indicated by a pre-defined semantic context operator may be indicated using a free semantic context operator. In an exemplary embodiment, a free semantic context operator may be a set of double parentheses appended to a semantic context statement, and the double parentheses may surround a free text description of the semantic context relationship. For example, "[Anti-Inflammation] ⋛ [Grape]::((*research studies done with grape extracts.));" describes a free semantic context where the relationship between Anti-Inflammation and Grapes is supported by research studies done with grape extracts.

A semantic marker defines a semantic relationship between semantic elements, such as those in semantic concept or semantic context relationships, in specific terms. A semantic marker statement may have a similar syntax as another type of statement, such as a semantic concept statement or a semantic context statement, but with a semantic marker operator replacing another operator. Text associated with the semantic marker operator may represent the semantic marker. In an exemplary embodiment, a semantic marker operator is a set of single parentheses surrounding the descriptive text of a semantic marker. In this exemplary embodiment, a semantic concept statement having the syntax "[A]::[B], [C];" or a semantic context statement having the syntax "[A] ⋛ [B], [C];" may be further described by a corresponding semantic marker statement having the syntax "[A](semantic marker) [B], [C];". For example, the semantic concept statement "[Grape]:: [Raisin], [Wine];" may be further defined using the semantic marker statement "[Grape](made into) [Raisin], [Wine];". Similarly, the semantic context statement "[Plants] ⋛ [Soil];" may be further defined using the semantic marker statement "[Plants] (grown in) [Soil];".

Multiple semantic markers related to a common operand may be collected as a semantic marker collection. For example, the common operand may be a semantic concept that appears as a subject operand in multiple semantic marker statements having different semantic markers. A semantic marker collection statement represents a semantic marker collection relationship using a semantic marker collection operator. In an exemplary embodiment, a semantic marker collection statement may have the form "[A] ⋏ (SemanticMarker1), (SemanticMarker2);" where "⊢" is a semantic marker collection operator. For example, the semantic marker collection statement "[Fruit]⋏ (grown in), (made into), (type), (variety), (good for);" lists several semantic markers used in semantic marker statements corresponding to semantic concept statements or semantic context statements with the semantic concept "Fruit".

A semantic realm defines a domain of knowledge that intersects with a number of other domains of knowledge. A semantic realm may be less specific than a semantic concept. A semantic realm relationship may differ from a semantic concept relationship in that the semantic realm relationship is not bound by a structure or hierarchical nature. A semantic realm statement may include a semantic realm, a semantic realm operator, and a semantic element, a semantic concept, a semantic marker, or another semantic realm to assign to the semantic realm. In an exemplary embodiment, a semantic realm statement has the general form "[A]⋎ <<Semantic Realm>>;" where "⋎" is a semantic realm operator and the operator "<< >>" indicates a semantic realm. For example, the semantic realm statement "[Cardiovascular], [Respiratory] ⋎ <<Medicine>>;" assigns the semantic elements or semantic concepts "Cardiovascular" and "Respiratory" to the semantic realm of "Medicine". The semantic realm statement "(grown in) ⋎ <<Geography>>;" assigns the semantic marker "grown in" to the semantic realm of "Geography". Multiple semantic markers may be assigned to a single semantic realm in one semantic realm statement, such as "(good for), (benefits) ⋎ <<Health>>;".

One semantic realm may be assigned to another semantic realm, such as "<<City>>⋎ <<Geography>>;". A semantic realm may be a semantic super-realm, which is one of two mutually exclusive semantic realms. For example, a pair of semantic super-realms may be "<<EDIBLE>>" and "<<NON-EDIBLE>>". The semantic realm statement "<<Ingredients>>⋎ <<EDIBLE>>;" assigns the semantic realm "Ingredients" to the sematic super-realm "EDIBLE". In this case, <<Ingredients>> may not be assigned to <<NON-EDIBLE>>.

Semantic inheritance allows semantic relationships of semantic elements or semantic concepts that are defined via semantic concepts or semantic contexts to be extended to other semantic elements or semantic concepts. Semantic inheritance can be applied to siblings of semantic elements or semantic concepts, to children (descendingly) of semantic elements or semantic concepts, or to parents (ascendingly) of semantic elements or semantic concepts, for a specified number of levels (N-levels) or all levels of available semantic concept or semantic context relationships of a semantic element or semantic concept marked for inheritance.

In an exemplary embodiment, a semantic inheritance statement for siblings as applied to semantic concept statements has the form "⊃ [A]::[X], [Y], [Z];" where "⊃ s" is a semantic inheritance operator indicating semantic inheritance at the sibling level to be applied to the semantic concept statement "[A]::[X], [Y], [Z];". For example, if the semantic concept statement "[Fruit]::[Grape], [Tomato], [Persimmon];" exists, the semantic inheritance statement "⊃ s [Grape]::[Anti-microbial];" will cause "Tomato" and "Persimmon", which are siblings of "Grape" in the above semantic concept statement, to inherit a semantic concept relationship with "Anti-microbial" ("[Tomato]::[Anti-microbial];" and "[Persimmon]::[Anti-microbial];").

In an exemplary embodiment, a semantic inheritance statement for siblings as applied to ⋛ semantic context statements has the form "⊃ s [A]⋛ [B]::[X], [Y], [Z];" where "⊃" is a semantic inheritance operator indicating semantic inheritance at the sibling level to be applied to the semantic context statement "[A]⋛ [B]::[X], [Y], [Z];". For example, if the semantic concept statement "[Fruit] [Grape], [Tomato], [Persimmon];" exists, the semantic inheritance statement "⊃ [Grape]⋛ [Health]::[Anti-microbial], [Anti-inflammation];" will cause "Tomato" and "Persimmon", which are siblings of "Grape" in the above semantic concept statement, to inherit a semantic context relationship with "Health" described by "Anti-microbial" and "Anti-inflammation" ("[Tomato]∋ [Health]::[Anti-microbial], [Anti-inflammation];" and "[Persimmon]∋ [Health]::[Anti-microbial], [Anti-inflammation];").

Semantic concept relationships can be extended N-levels descendingly to children of a semantic element or semantic concept. This may be done by indicating the descending direction and the inheritance level with the semantic inheritance operator and the intended semantic element or semantic concept. The computer system performing the method of representing semantic definitions on a computing device 100 will search for the existence of Hypernym/Hyponym, Holonym/Meronym, or Troponym relationships containing the intended semantic element or semantic concept and traverse accordingly through the indicated number of descending levels, and extend the semantic concept relationship for each of the applicable semantic elements or semantic concepts.

In an exemplary embodiment, an N-level descending semantic inheritance statement for semantic concept relationships has the form "⊃ >>n [A]::[X], [Y], [Z];" where "⊃ >>n" is a semantic inheritance operator in which ">>" indicates the descending direction and "n" indicates the number of levels to traverse. For example, if the statement "[Fruit]::>[Grape], [Tomato], [Persimmon];" exists, "⊃ >>1 [Fruit]::[Anti-microbial];" will create semantic inheritance descending one level such that "Grape", "Tomato", and "Persimmon" which are hyponyms of "Fruit" will each inherit a semantic concept relationship with the semantic element "Anti-microbial".

Similarly, semantic context relationships can be extended N-levels descendingly to children of a semantic element or semantic concept. This may be done by indicating the descending direction and the inheritance level with the semantic inheritance operator and the intended semantic element or semantic concept. The system will search for the existence of Hypernym/Hyponym, Holonym/Meronym or Troponym relationships containing the intended semantic element or semantic concept and traverse accordingly through the indicated number of descending levels, and extend the semantic context relationship for each of the applicable semantic elements or semantic concepts.

In an exemplary embodiment, an N-level descending semantic inheritance statement for ∋ semantic context relationships has the form "⊃ >>n [A]∋ [B];" where "⊃ >>n" is a semantic inheritance operator in which ">>" indicates the descending direction and "n" indicates the number of levels to traverse. For example, if the statements "[Vegetables]::>[Cruciferous vegetables], [Root vegetables];" and "[Cruciferous vegetables]::>[Broccoli], [Cauliflower];" exist, "⊃ >>2 [Vegetables] ∋ [Anti-inflammation];" will create semantic inheritance descending two levels of "Vegetables" such that "Cruciferous vegetables" and "Root vegetables", which are first level hyponyms of "Vegetables, and "Broccoli" and "Cauliflower", which are second level hyponyms of "Vegetables" through "Cruciferous vegetables", will inherit a semantic context relationship with the semantic concept "Anti-inflammation".

In another exemplary embodiment, an N-level descending semantic inheritance statement semantic context relationships has the form "⊃ >>>n [A]∋ [B]::[X], [Y], [Z];". For example, if the statements "[Vegetables]::>[Cruciferous vegetables], [Root vegetables];" and "[Cruciferous vegetables]::>[Broccoli], [Cauliflower];" exist, "⊃ >>2 [Vegetables]∋ [Health]::[Anti-inflammation];" will create semantic inheritance descending two levels of "Vegetables" such that "Cruciferous vegetables" and "Root vegetables", which are first level hyponyms of "Vegetables, and "Broccoli" and "Cauliflower", which are second level hyponyms of "Vegetables" through "Cruciferous vegetables", will inherit a semantic context relationship with the semantic concept "Health" described by the semantic element "Anti-inflammation" as member of the semantic context relationship. It may be noted that only the indicated semantic element "Anti-inflammation" is inherited in this example. If the semantic context statement "[Vegetables]∋ [Health]::[Anti-microbial];" exists but is not indicated in a semantic inheritance statement, then it will not be inherited.

Semantic concept relationships can be extended to all available levels descendingly to children of a semantic element or semantic concept. This may be done by indicating the descending direction and all levels with the semantic inheritance operator and the intended semantic element or semantic concept. The system will search for the existence of Hypernym/Hyponym, Holonym/Meronym, or Troponym relationships containing the intended semantic element and traverse all descending levels, and extend the semantic concept relationship for each of the applicable semantic elements or semantic concepts.

In an exemplary embodiment, an all-level descending semantic inheritance statement for semantic concept relationships has the form "⊃ >>>a [A]::[X], [Y], [Z];" where "⊃ >>>a" is a semantic inheritance operator in which ">>" indicates the descending direction and "a" indicates traversal of all levels. For example, if the statements "[Plant-based Food]::>[Vegetables], [Tofu], [Grains];", "[Vegetables]::>[Cruciferous vegetables], [Root vegetables];", and "[Cruciferous vegetables]::>[Broccoli], [Cauliflower];" exist, "⊃ >>a [Plant-based Food]::[Anti-inflammation];" will create semantic inheritance for all descending levels such that "Vegetables", "Tofu", "Grains", "Cruciferous vegetables", "Root vegetables", "Broccoli", and "Cauliflower" will all inherit a semantic concept relationship with the semantic element "Anti-inflammation".

Similarly, semantic context relationships can be extended to all available levels descendingly to children of a semantic element or semantic concept. This may be done by indicating the descending direction and all levels with the semantic inheritance operator and the intended semantic element or semantic concept. The system will search for the existence of Hypernym/Hyponym, Holonym/Meronym, or Troponym relationships containing the intended semantic element or semantic concept and traverse all descending levels, and extend the semantic context relationship for each of the applicable semantic elements or semantic concepts.

In an exemplary embodiment, an all-level descendingsemantic inheritance statement for semantic context relationships has the form "⊃ >>>a [X]∋ [A], [B], [C];" where "⊃ >>>a" is a semantic inheritance operator in which ">>" indicates the descending direction and "a" indicates the traversal of all levels. For example, if the statements "[Plant-based Food]::>[Vegetables], [Tofu], [Grains];", "[Vegetables]::>[Cruciferous vegetables], [Root vegetables];", and "[Cruciferous vegetables]::>[Broccoli], [Cauliflower];" exist, "⊃ >>a [Plant-based Food]∋ [Health]::[Anti-inflammation];" will create semantic inheritance descending all levels of "Plant-based Food" such that all of "Vegetables" "Tofu", "Grains", "Cruciferouos vegetables", "Root vegetables", "Broccoli", and "Cauliflower" will inherit a semantic context relationship with the semantic concept "Health" described by the semantic element "Anti-inflammation" as member of the semantic context relationship.

Similarly, semantic concept relationships can be extended N-levels ascendingly to parents of a semantic element or semantic concept. This may be done by indicating the ascending direction and the inheritance level with the semantic inheritance operator and the intended semantic element or semantic concept. The system will search for the existence of Hypernym/Hyponym, Holonym/Meronym, or Troponym relationships containing the intended semantic element or semantic concept and traverse the indicated number of ascending levels, and extend the semantic concept relationship for each of the applicable semantic elements or semantic concept. In some embodiments, relationships may be further extended to members of parents, such as hyponyms, meronyms, or troponyms of parents.

In an exemplary embodiment, an N-level ascending semantic inheritance statement for semantic concept relationships has the form "⊃ <<n [A]::[X], [Y], [Z];" where "⊃<<n" is a semantic inheritance operator in which "<<" indicates the ascending direction and "n" indicates the number of levels to traverse. For example, if the statement "[Berry]::>[Grape], [Raspberry], [Blueberry];" exists, "⊃ <<1 [Grape]::[Anti-microbial];" will create semantic inheritance ascending one level such that "Berry" which is a hypernym of "Grape" will inherit a semantic concept relationship with the semantic element "Anti-microbial". In some embodiments, ascending inheritance includes siblings, or other children of the parent, such that "Raspberry" and "Blueberry" would also inherent "Anti-microbial".

Similarly, semantic context relationships can be extended N-levels ascendingly to parents of a semantic element or semantic concept. This may be done by indicating the ascending direction and the inheritance level with the semantic inheritance operator and the intended semantic element or semantic concept. The system will search for the existence of Hypernym/Hyponym, Holonym/Meronym, or Troponym relationships containing the intended semantic element or semantic concept and traverse the indicated number of ascending levels, and extend the semantic context relationship for each of the applicable semantic elements or semantic concepts.

In an exemplary embodiment, an N-level ascending semantic inheritance statement for semantic context relationships has the form "⊃ 2<<n [A]≾ [B];" where "⊃ <<n" is a semantic inheritance operator in which "<<" indicates the ascending direction and "n" indicates the number of levels to traverse. For example, if the statements "[Vegetables]::>[Cruciferous vegetables], [Root vegetables]" and "[Cruciferous vegetables]::>[Broccoli], [Cauliflower];" exist, "⊃ <<2 [Cauliflower]≾ [Anti-inflammation];" will create semantic inheritance ascending two levels above "Cauliflower" such that "Cruciferous vegetables", which is a first level hypernym of "Cauliflower", and "Vegetables", which is a second level hypernym of "Cauliflower" through "Cruciferous vegetables", will inherit a semantic context relationship with the semantic concept "Anti-inflammation".

In another exemplary embodiment, an N-level ascending semantic inheritance statement for semantic context relationships has the form "⊃ <<n [A]≾ [B]::[X], [Y], [Z];". For example, if the statements "[Vegetables]::>[Cruciferous vegetables], [Root vegetables];" and "[Cruciferous vegetables]::>[Broccoli], [Cauliflower];" exist, "⊃ <<2 [Cauliflower]≾ [Health]::[Anti-inflammation];" will create semantic inheritance ascending two levels above "Cauliflower" such that "Cruciferous vegetables", which is a first level hypernym of "Cauliflower", and "Vegetables", which is a second level hypernym of "Cauliflower" through "Cruciferous vegetables", will inherit a semantic context relationship with the semantic concept "Health" together with the semantic element "Anti-inflammation" as member of the semantic context relationship. It may be noted that only the indicated semantic element "Anti-inflammation" is inherited. If the semantic context statement "[Cauliflower]≾ [Health]::[Anti-microbial];" exists but is not indicated in a semantic inheritance statement, then "Anti-microbial" will not be inherited.

Semantic concept relationships can be extended to all available levels ascendingly to parents of a semantic element or semantic concept. This may be done by indicating the ascending direction and all levels with the semantic inheritance operator and the intended semantic element or semantic concept. The system will search for the existence of Hypernym/Hyponym, Holonym/Meronym, or Troponym relationships containing the intended semantic element or semantic concept and traverse all ascending levels, and extend the semantic concept relationship for each of the applicable semantic elements or semantic concepts.

In an exemplary embodiment, an all-level ascending semantic inheritance statement for semantic concept relationships has the form "⊃ <<a [A]::[X], [Y], [Z];" where "⊃ <<a" is a semantic inheritance operator in which "<<" indicates the ascending direction and "a" indicates traversal of all levels. For example, if the statements "[Plant-based Food]::>[Vegetables], [Tofu], [Grains];", "[Vegetables]::>[Cruciferous vegetables], [Root vegetables];", and "[Cruciferous vegetables]::>[Broccoli], [Cauliflower], [Cabbage];" exist, "⊃ <<a [Cabbage]::[Anti-inflammation];" will create semantic inheritance for all ascending ⊃ levels such that "Cruciferous vegetables", "Vegetables", and "Plant-based Food" will all inherit a semantic concept relationship with the semantic element "Anti-inflammation".

Similarly, semantic context relationships can be extended to all levels ascendingly to parents of a semantic element or semantic concept. This may be done by indicating the ascending direction and all levels with the semantic inheritance operator and the intended semantic element or semantic concept. The system will search for the existence of Hypernym/Hyponym, Holonym/Meronym, or Troponym relationships containing the intended semantic element or semantic concept and traverse all ascending levels, and extend the semantic context relationship for each of the applicable semantic elements or semantic concepts.

In an exemplary embodiment an all-level ascending semantic inheritance statement has the form "⊃ <<a [X] ≾ [A], [B], [C];" where "⊃ <<a" is a semantic inheritance operator in which "<<" indicates the ascending direction and "a" indicates traversing all levels. For example, if the statements "[Plant-based Food]::>[Vegetables], [Tofu], [Grains];", "[Vegetables]::>[Cruciferous vegetables], [Root vegetables];", and "[Cruciferous vegetables]::>[Broccoli], [Cauliflower], [Cabbage];" exist, "⊃ <<a [Cabbage] ≾ [Health]:: [Anti-inflammation];" will create semantic inheritance ascending all levels of "Cabbage" such that each of the semantic concepts "Cruciferous vegetables", "Vegetables", and "Plant-based Food" will inherit a semantic context relationship with the semantic concept "Health" with the semantic element "Anti-inflammation" as member of the semantic context relationship. In one embodiment, the semantic context relationship is further extended to hyponym members of "Cruciferous vegetables" ("Brocooli" and "Cauliflower"), "Vegetables" ("Cruciferous vegetables" and "Root vegetables"), and "Plant-based Food" ("Vegetables", "Tofu", and "Grain").

A semantic instance further defines a semantic element or semantic concept with specific content. For example, a semantic element "[Winery]" may have a semantic instance that is the exact name of a winery, such as "[Deer Hills Winery]". Semantic instances may be defined by a user who has authoring rights in a semantic definition management editor. In the semantic definition management editor, semantic instances may be chosen from a menu as a single selection, multiple exclusive selections (OR conditions), and/or multiple non-exclusive selections (AND conditions).

In an exemplary embodiment, a semantic instance statement has the general form "[A]Φ {B};" where A is a semantic element or a sematic concept, "0" is a semantic instance operator, and B is a semantic instance, such as "[Winery]Φ {Deer Hills Winery}". Semantic instance statements may have the form "[A]Φ {B}, {C}" for multiple non-exclusive selections (AND conditions) such as "[Taste] Φ {Sweet}, {Sour}, {Bitter};", in which a user may select any combination of "Sweet", "Sour", "Bitter" as semantic instances of "Taste". Semantic instance statements having multiple exclusive selections (OR conditions) may have the form "[A]Φ {B}|{C};" such as "[Fiber]Φ {High}|{Low};", in which a user may choose only one of "High" or "Low" as a semantic instance of "Fiber". To ensure that a semantic instance cannot be defined by a user during visual definition processing, a semantic instance statement may have the form "[A]Φ 0;" such as "[Grape]Φ 0;", which prevents a user form defining a semantic instance of "Grape". In a graphical user interface, multiple non-exclusive selections may be presented to a user as checkboxes, and multiple exclusive selections may be presented to a user as radio buttons during visual processing and/or visual search.

Semantic instances may be represented in other languages or writing systems through semantic instance internationalization definitions represented in semantic instance internationalization statements. Semantic instance internationalization statements include a semantic instance in a first language or writing system, a semantic instance internationalization operator, and a translation of the semantic instance into a second language or writing system. A user may select languages via a language switch of a graphical user interface to determine which languages to use during search or other processing.

In an exemplary embodiment, a semantic instance internationalization statement has the general form "@aa{SemanticlnstanceX} Δ @xx{TranslatedSemanticlnstanceX}" where "Δ" is a semantic instance internationalization operator, "@aa" is a language code operator including a two-letter language code identifying the original language of the semantic instance, and "@xx" is a language code operator including a two-letter language code identifying the translated language of the semantic instance. For example, "@en{Grape} Δ @de{Weintraube}, @es {Uva};" represents a semantic instance internationalization relationship in which the English language ("en") semantic instance "Grape" is translated into the German language ("de") semantic instance "Weintraube" and the Spanish language ("es") semantic instance "Uva".

For languages with multiple writing systems, such as Japanese, semantic instance internationalization can be defined for each of the writing systems. A default writing system for a language may be selected from multiple writing systems.

In an exemplary embodiment, a semantic instance internationalization statement indicating different writings systems for a single language uses a writing system operator of the form "@xx-yy" where "xx" identifies the language and "yy" identifies the writing system. The semantic instance internationalization statement may use "!" as a default writing system operator. For example the semantic instance internationalization statement "@en{Grape}Δ !@jp-hg{ ぶどう }, @jp-kj{葡萄}, @jp-kk{ブドウ}, @jp-rj{budou};" represents that the English language semantic instance "Grape" is translatable into Japanese in four different writing systems (Hiragana abbreviated as "hg", Kanji abbreviated as "kj", Katakana abbreviated as "kk", and Romaji abbreviated as "rj"). Hiragana is selected as the default writing system by the default writing system operator, so if a user interface's language selection is Japanese without any writing system specified, results will be returned to the user in Hiragana.

Semantic internationalization definitions may be used to translate semantic elements or semantic concepts into other languages or writing systems. Semantic internationalization statements may be formed substantially similarly to semantic instance internationalization statements, as described above. In an exemplary embodiment, a semantic internationalization statement has the general form "@aa[SemanticElement/SemanticConcept]Δ @xx[Translated SemanticElement/SemanticConcept]" where "Δ" is a semantic internationalization operator (which may be the same as a semantic instance internationalization operator), and "@aa" and "@xx" are respective language code operators for the original and translated languages (which may be the same as a language code operators for semantic instance internationalization statements). For example, "@en{Grape} Δ @de{Weintraube}, @es {Uva};" represents a semantic internationalization relationship in which the English language semantic concept "Grape" is translated into the German language semantic concept "Weintraube" and the Spanish language semantic concept "Uva".

A semantic element or concept may be translated into a different writing system in a manner substantially similarly to semantic instances, as described above. In an exemplary embodiment, a semantic internationalization statement for translation to different writing systems has the general form "@aa[SemanticlnstanceX]Δ @xx-yy[TranslatedSemanticInstance written in system yy of language xx]. For example, "@en[Grape]Δ !@jp-hg [ぶどう], @jp-kj[葡萄], @jp-kk[ブドウ], @jp-rj[budou];" represents that the English language semantic element "Grape" is translatable into Japanese in four different writing systems, and Hiragana is selected as the default writing system using the default writing system operator "!".

Lexical functions define synonyms, antonyms, and grammatical forms of semantic elements and semantic concepts. A lexical function definition may be represented as a lexical function statement including a semantic element or semantic concept, a lexical function operator, and a synonym, antonym, or grammatical form of the semantic element or semantic concept, depending on the lexical function operator.

In an exemplar embodiment, a synonym lexical function statement has the general form "[A]ア [Synonym];" where "ア" is a synonym lexical function operator. For example, "[Vegetables]ア [Veggies];" represents that "Vegetables" and "Veggies" are synonyms. The system may treat synonyms interchangeably, such that any semantic relationship including "Vegetables" is also applicable to "Veggies".

In an exemplary embodiment, an antonym lexical function statement has the general form "[A]> <[B]" where ">  <" is an antonym lexical function operator. For example, "[North]> <[South]" represents that "North" and "South" are antonyms.

Grammatical forms of a semantic element or semantic concept may include singular/plural forms. In an exemplary embodiment, a singular/plural lexical function statement has the general form "[A]=sp=[B];" where "=sp=" is a singular/plural lexical function operator indicating that "A" is the singular form and "B" is the plural form. For example, "[Grape]=sp=[Grapes];" represents that "Grape" has the plural form "Grapes".

Grammatical forms of a semantic element or a semantic concept may include word form variations. Word form variations are similar to synonyms, however the difference is that word form variations can be further defined with grammatical rules. In an exemplary embodiment, a word form variation lexical function statement has the general form "[A]==[B];" where "==" is a word form variation lexical function operator indicating that "A" and "B" are variations of the same word. For example, "[variety]==[varietal];" represents that "variety" and "varietal" are different word forms of the same semantic element or semantic concept. Word form variations may be restricted to particular semantic realms. This may be represented by the general form "[A]==[B]↳ <<SemanticRealm>>;". For example, "[variety]==[varietal]↳ <<Botany>>;" represents that "variety" and "varietal" are word form variations of one another only in the semantic realm of "Botany".

For each semantic definition, the author can and preferably does provide a reference a to trustable source, such as a Uniform Resource Locator (URL) referring to the source of the knowledge/information supporting the semantic definition. The reference may include a brief description of the source. The source can be the author's personal site or another external site. A single reference or multiple references can be applied for one semantic definition statement, or references can be applied to a full metaset.

A semantic reference definition may be added to any semantic definition statement using a semantic reference operator. In an exemplary embodiment, a semantic reference statement has the form "[A]::[B]; ▽URL ((description));" where "[A]::[B];" is any type semantic definition statement described above, "▽" is a semantic reference operator, "URL" is a URL linking to a source of information, and "((description))" is a free text description of the source. For example, "[Cabbage]::[Anti-inflammation]; ▽http://www.xyz.org ((XYZ Health Institute, July 2010));" represents that the semantic concept relationship between "Cabbage" and "Anti-inflammation" is supported by information at http://www.xyz.org, which was available from the XYZ Health Institute as of July 2010. In another example, "[Cabbage]::[Anti-inflammation]; ▽http://www.xyz.org ((XYZ Health Institute, July 2010)), http://www.cde.com ((CDE Association, August 2016));" a second source is provided.

A semantic reference definition applied to a full metaset includes a reference to the metaset, a semantic reference operator, and a citation to a source. In an exemplary embodiment, a statement including a semantic reference definition applied to a full metaset has the general form "(ス) ▽URL ((description));" where "(ス)" refers to the metaset currently being edited. For example, "(ス) ▽http://www.xyz.org ((XYZ Health Institute, July 2010)), http://www.cde.com ((CDE Association, August 2016));" represents two sources applied to the metaset currently being edited. In other embodiments, a metaset may be referred to by filename, URL, or other reference indicator.

Referring to FIG. 1, in step 120, the semantic definition statements are saved in a collection known as a metaset. In one embodiment, the metaset is a database. In other embodiments, the metaset may be any type of file capable of storing text and operators. A metaset may have a unifying semantic theme, such as "Fruit" or "Fish". A metaset may be edited by a unique author or by any number of authors with editing rights. An example of a metaset may be a collection of all of the semantic definitions statements regarding fruits and vegetables described above.

In step 130, the metaset is converted into a digital data structure. In step 140, the digital data structure is stored in a memory storage device of a computer device. In some embodiments, the memory storage device may be a hard disk. In other embodiments, the memory storage device may be RAM, cloud storage, a USB drive, CD, or any other memory storage device known in the art. Various embodiments of computer systems that may execute the method of representing semantic definitions on a computing device 100 are described below with reference to FIG. 7.

FIG. 2 illustrates a semantic definition management editor 200 according to an embodiment of the present invention. The semantic definition management editor may be used to compose semantic definition statements 210 of metaset 220 as in step 110.

The editor may be enhanced with a pre-configured set of templates 230 of semantic definition statements providing ready-to-use semantic definition statements for users with authoring rights to define and assign semantic relationships as a metaset. The templates may include template semantic definition statements to assist in defining semantic concepts, semantic contexts, semantic markers, semantic realms, semantic inheritances, semantic instances, lexical functions, semantic references, and semantic internationalizations.

As part of metaset creation in the semantic definition management editor, a user may be prompted to describe the semantics of the metaset. Semantics of a metaset may include a title, such as "Fish and Health", semantics in the form of key:value pairs, such as "animal:Fish", and a free text description of the metaset, such as "Fish and their health benefits". Key:value pairs may allow for convenient organization of metasets, while free text descriptions may allow users to easily include any information they consider relevant to the metasets.

Semantic definition management editor 200 is equipped with functions such as open, create, save, and save as to manage metasets. Once a metaset is saved, it is converted into a data structure and stored in a digital format available for editing, querying, and searching during semantic definition and visual semantic search operations.

Saving a metaset triggers the auto-recognition of semantic definition statements including semantic concept (general, hypernym/hyponym, holonym/meronym, troponym, free), semantic context (general, free), semantic marker (general, semantic marker collection), semantic realm (general, marker-realm, realm-realm, realm-super-realm), semantic inheritance, semantic instance, lexical function, semantic references, and semantic internationalization statements. Auto-recognition of semantic definition statements may identify the types of semantic definitions statements and components of the semantic definition statements. The semantic definition management editor may provide feedback indicating successful recognition of semantic definition statements or errors in the semantic definition statements.

Editing of a metaset via the semantic definition management editor 200 is available while in visual processing or outside of visual processing. While in visual processing, the author of the metaset being used for visual semantic processing (or in the case of a non-author for a metaset marked as either publicly editable or selectively editable with the current user having rights to modify the metaset) can pause or temporarily exit the visual semantic processing to edit the metaset. Once the editing is completed (by the save action of the user) in the semantic definition management interface, the computer system running the semantic definition management editor 200 will verify the changes made to the metaset.

Once verified, user will be redirected back to the visual semantic processing interface where the user left off. The user can then continue the visual semantic processing using the modified metaset.

Outside of visual processing, a user would access semantic definition management editor 200, search for the filename of a metaset or select the filename from a list of metasets, and open the metaset using the open function in the interface. Once opened, the metaset is presented inside an online editor for an author to edit and save the metaset. The system will then verify the changes to ensure the format is fully compliant before the system updates the data structure of the metaset.

All saved metasets may be compiled together and published as a playlist in a metaset library with their attributes/descriptors such as title, metaset name, author, username, semantics, description, and last modified date made available and searchable to users in order to explore, discover, and edit the metaset (for users with such rights). The metaset library may be viewed in a window of the semantic definition management editor, or it may be viewable independently. Furthermore, the metaset library playlist may provide a function where the content of the metaset can be viewed directly via a click or single action on a user interface, without having to access the online editor.

Figure 3:
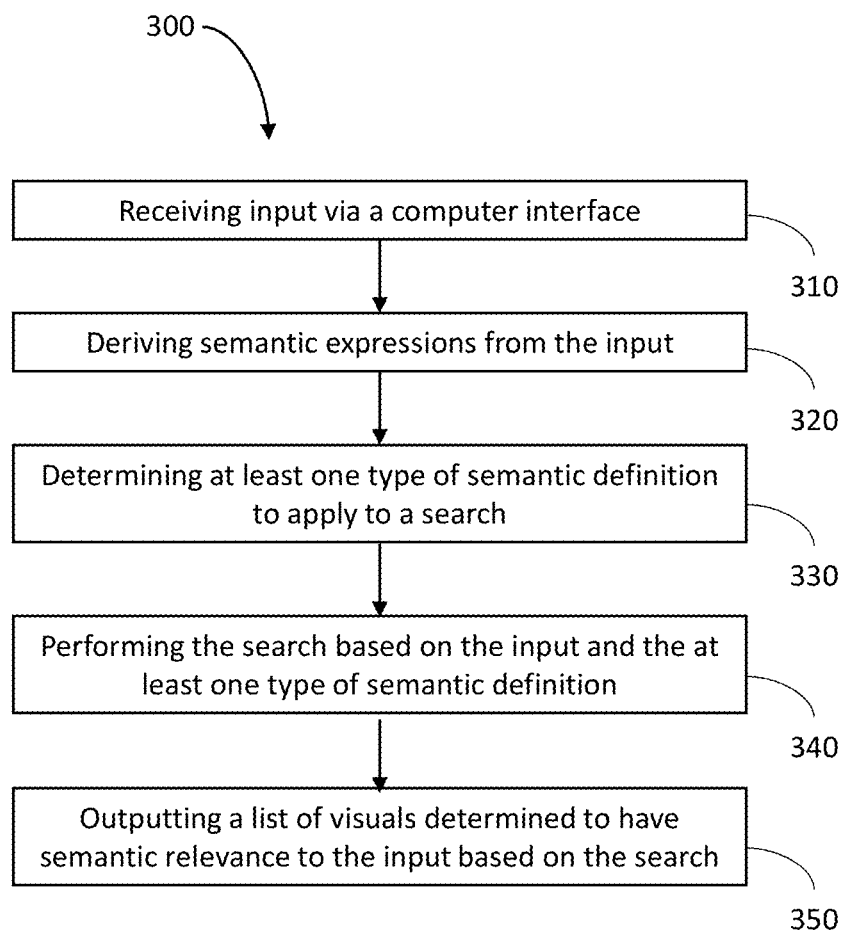
FIG. 3 is a block diagram illustrating a method of semantically searching for a visual according to an embodiment of the present invention.

FIG. 3 illustrates a method of semantically searching for a visual 300 according to an embodiment of the present invention. Once visuals have been processed (as described, for example, in Japan Patent No. 6830514), the visuals are available to be searched semantically.

In step 310, input is received via a computer interface. The input may include text. For example, text terms may include "Fish" and "Herring". The input may include multiple choice selections from a graphical user interface. For example, a selection may be made to indicate a semantic relationship between "Fish" and "Herring". The input may include an image, for example a picture of a herring, for finding detailed information or semantics of the input image or visuals similar to the input image. The input may be received from a local system or a remote system across a network.

In step 320, semantic expressions are derived from the input. Semantic expressions convey semantic meaning in a form that may be different than the form of a semantic definition statement. The semantic expressions may be identical to text input. The semantic expressions may be simple keywords. The semantic expressions may have the strict form of semantic definition statements as described above. The semantic expressions may be text derived from an input visual through visual processing. The semantic expressions may express all or part of a semantic definition. The semantic expressions may be user-intuitive framings of semantic definitions statements. For example, semantic expressions may associate keywords or phrases through multiple choice selections from a user interface, and the keywords or phrases may correspond to operands of semantic definition statements.

Users may also select items from a menu corresponding to operators of semantic definition statements. In the example above, the text input "Fish" and "Herring" along with a multiple choice selection indicating a Herring is a type of Fish is used to derive a semantic expression indicating a hypernym/hyponym semantic concept relationship between "Fish" and "Herring".

In step 330, at least one type of semantic definition is determined to apply to the visual search. The types of semantic definitions may include any of the semantic definitions described above, such as semantic element definitions, semantic concept definitions, semantic context definitions, semantic marker definitions, semantic realm definitions, semantic inheritance definitions, semantic instance definitions, semantic internationalization definitions, lexical function definitions, and semantic reference definitions. For example, the search may be performed only according to semantic element definitions, semantic concept definitions, and semantic context definitions. The determination of which types of semantic definitions to apply may be based on user input. The determination may alternatively be automatically applied by the computer system performing method of semantically searching for a visual 300.

In step 340, the search is performed based on the input, such as by using the semantic expressions, and the at least one type of semantic definition that was determined to apply to the search. The search may additionally be based on "active" metasets selected by the user. A metaset created in a manner described above may be used to apply semantic definitions to the search, where the types of semantic definitions are chosen by the user and applied to the input or semantic expressions derived from the input. Active metasets may be selected from a user interface in which metasets may be searched, sorted, or otherwise presented by attributes such as a metaset name, title, semantics, description, author, authorized users, or last modified date. For example, a "Fish" metaset including semantic definitions for visuals of various types of Fish may be applied to a search for "Herring" as a hyponym of "Fish".

The search may be executed to require that semantic definitions match all of the semantic expressions, such as both "Fish" and "Herring", or any subset of the semantic expressions, such as any of "Fish" and "Herring". A strict semantic search may be chosen to require that semantic expressions strictly match the form of a semantic definition in order to be considered a match. Alternatively, under a loose semantic search, a semantic expression may match terms of a semantic definition without regard to the strict form of a semantic definition to be considered a match. For example, if "Fish" and "Herring" are input as having a general semantic concept relationship, then a visual having a semantic definition that "Herring" is a hyponym of "Fish" will match the input under a loose semantic search but not under a strict semantic search. Alternatively, a pivot search may match certain specified semantic expressions to semantic definitions strictly while matching other semantic expressions loosely. For example, a pivot search may require "Herring" to be searched strictly as a hyponym of "Fish" while "Tuna" may match a semantic definition that does not specify "Tuna" being a hyponym of "Fish". The search can be specified to include all visuals available for search or only "my visuals", which are visuals processed by the logged-in user performing the search.

In step 350, a list of visuals determined to have semantic relevance to the input based on the search is output. In the example above, the list of visuals may contain images including herring. A user may select a visual from the list of visuals to view the visual or to view semantic definitions associated with the visual.

Figure 4:
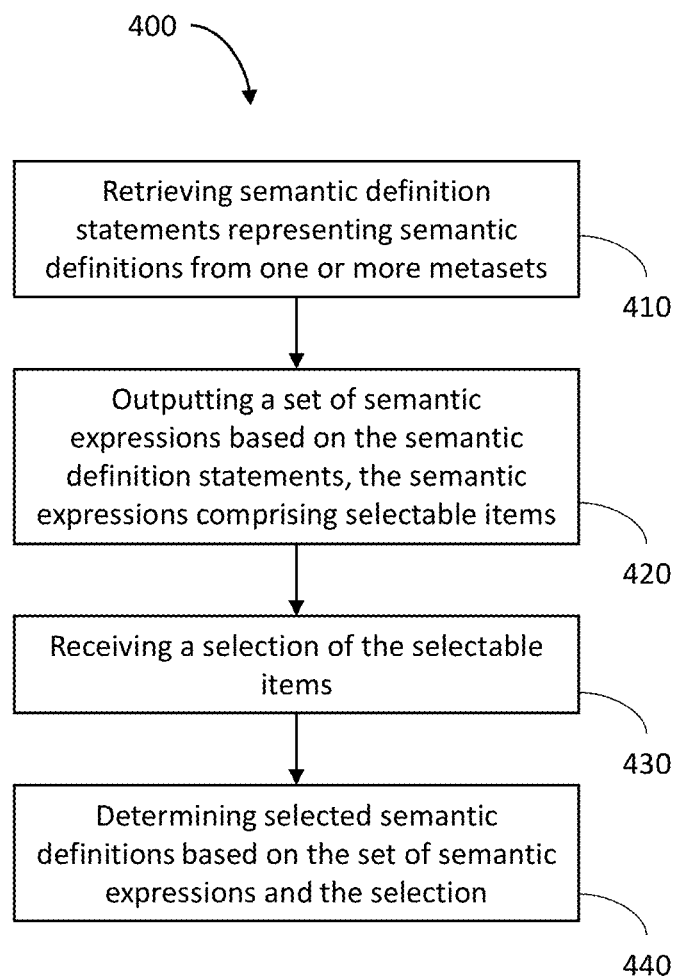
FIG. 4 is a block diagram illustrating a method of selecting semantic definitions from a metaset according to an embodiment of the present invention.

FIG. 4 illustrates a method of selecting semantic definitions from a metaset 400 according to an embodiment of the present invention. Allowing a user to select semantic definitions from a metaset has several applications, including navigating through the metaset (FIG. 5) and filtering the metaset (FIG. 6).

In step 410, semantic definition statements are retrieved from one or more metasets. As described above, the semantic definition statements represent semantic definitions and may have the general form of a subject operand, an operator, and at least one object operand.

In step 420, a set of semantic expressions based on the semantic definition statements is output. The set of semantic expressions includes selectable items, such as selectable operands and operators or user-intuitive items corresponding to operands and operators such as images or pictographs. The output may be displayed on a graphical user interface.

In step 430, a selection of the selectable items is received. The selection may be made by a user in a graphical user interface.

In step 440, selected semantic definitions are determined based on the set of semantic expressions and the selection of selectable items. This may be done by matching the semantic expressions and the selection of selectable items to corresponding operators and operands of semantic definition statements.

Figure 5:
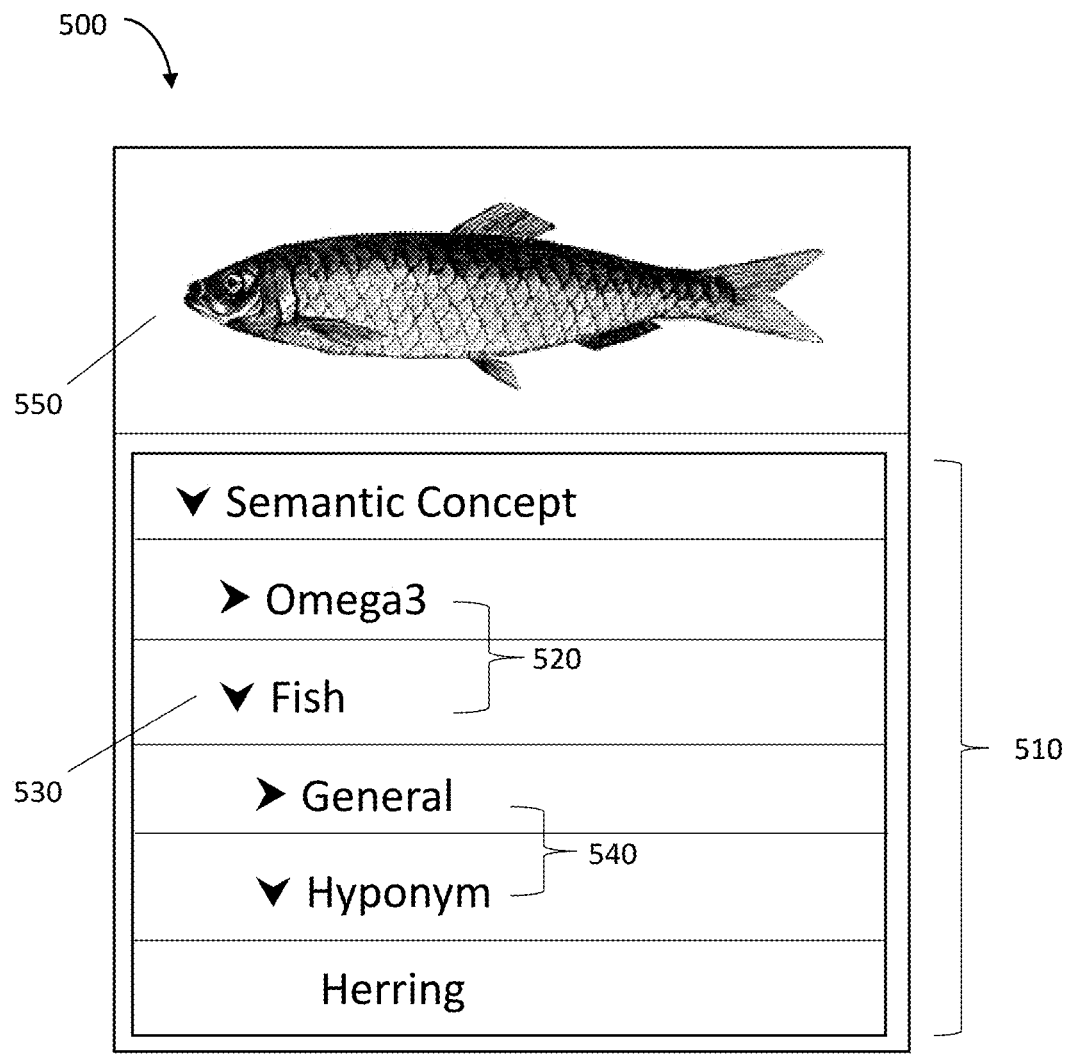
FIG. 5 is a diagram illustrating a user interface for navigating a metaset according to an embodiment of the present invention.
Figure 6:
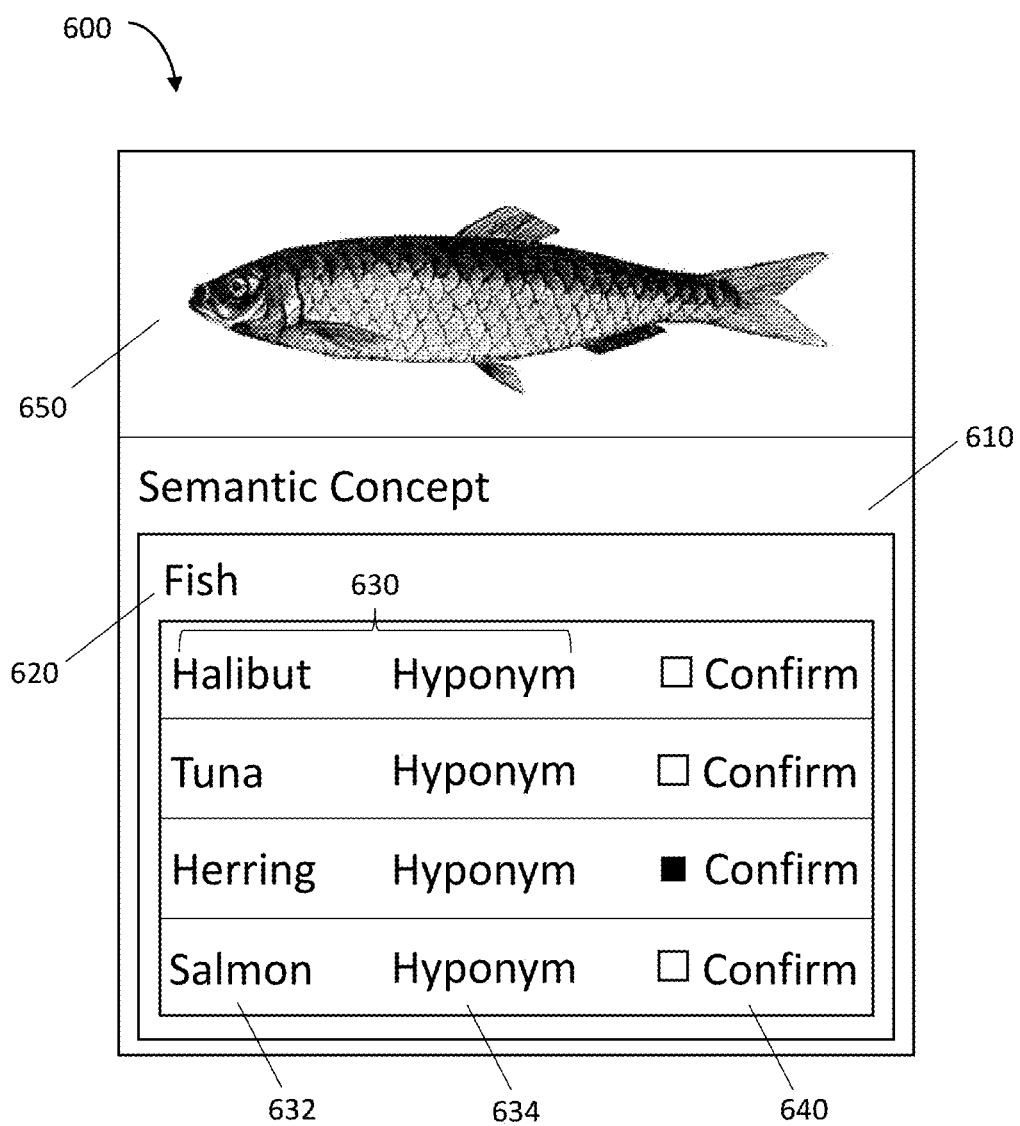
FIG. 6 is a diagram illustrating a user interface for filtering a metaset according to an embodiment of the present invention.

FIG. 5 illustrates a user interface 500 for navigating a metaset according to an embodiment of the present invention. As seen in user interface 500, an accordion menu 510 is output in which semantic expressions 520 corresponding to operands of semantic definition statements from a metaset are selectable (step 420). A user selects a selection 530 desired for navigation from semantic expressions 520. The computer system running the user interface 500 receives the selection 530 (step 430), determines corresponding semantic definitions (step 440), and updates the accordion menu 510 accordingly, such as by expanding beneath selection 530 with additional menu items 540. Accordion menu 510 may later be updated by collapsing additional menu items 540 beneath the selection 530.

Visuals 550 may be provided to display one or more visuals associated with the selection 530. For example, if selection 530 corresponds to the semantic concept "Fish", a sub-menu of additional items 540 is expanded such that different types of semantic concepts are selectable, such as "General" and "Hyponym". Further selecting "Hyponym" expands another sub-menu that lists hyponyms of "Fish" such as "Herring". In this manner, a metaset may be navigated.

FIG. 6 illustrates a user interface 600 for filtering a metaset according to an embodiment of the present invention. As seen in user interface 600, a menu 610 is output displaying a semantic expression 620 corresponding to a subject operand, a list of selectable semantic expression pairs 630 corresponding to object operands 632 and operators 634 (step 420). A user may select a confirmation box 640 for each of the semantic expression pairs 630 that the user wishes to use to filter the metaset. Visuals 650 may be one or more visuals included to guide the selection of the user. Additionally or alternatively, text or sound may be included to guide the selection of the user. The computer system running user interface 600 receives the selection (step 430) and filters the metaset to exclude semantic definitions corresponding to semantic expression 620 and the semantic expression pairs 630 with unselected confirmation boxes 640 (step 440). For example, semantic expression 620 may correspond to the semantic concept "Fish". Semantic expression pairs 630 may include types of fish as object operands 632 and indicate that the types of fish are hyponyms as operators 634. A user may view visual 650 and recognize a herring. The user then selects only the confirmation box 640 corresponding to "Herring". The system receives this selection of only "Herring" as a hyponym of "Fish" and filters the metaset to exclude "Halibut", "Tuna", and "Salmon" as hyponyms of "Fish".

Figure 7:
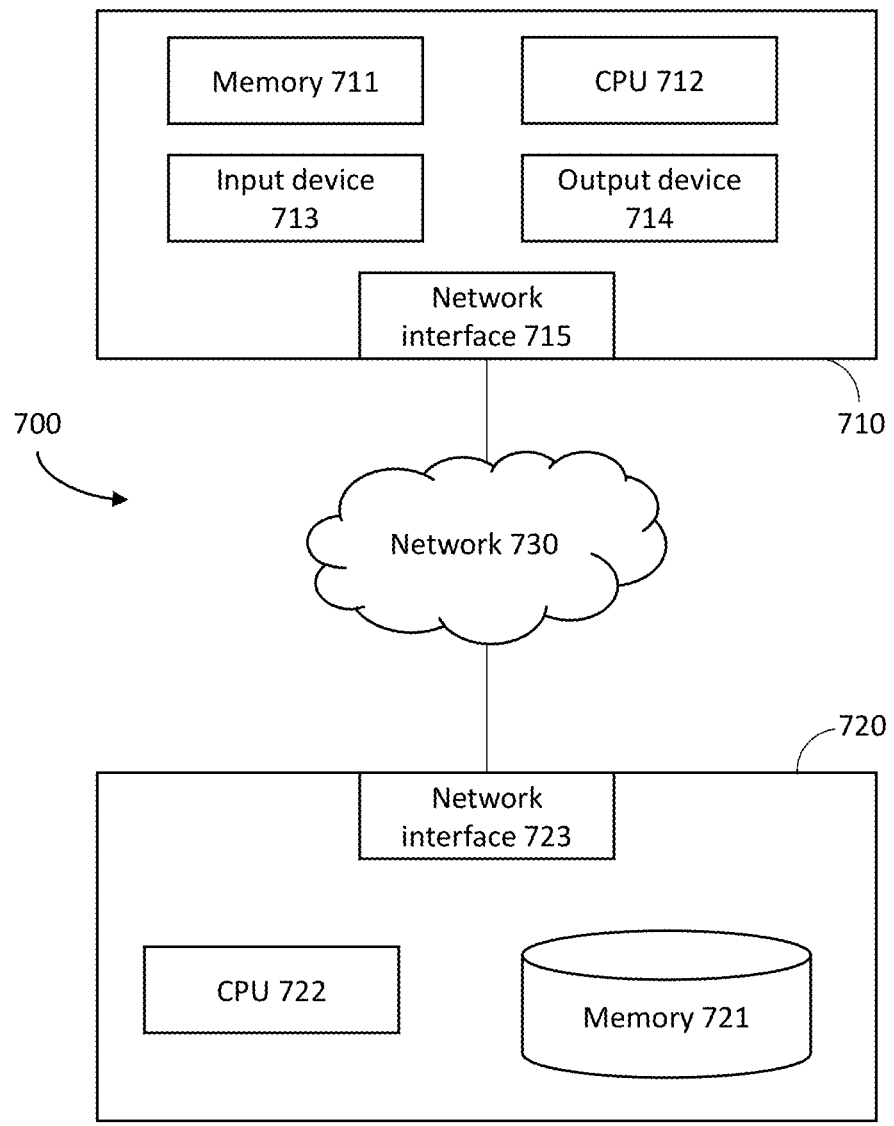
FIG. 7 is a block diagram illustrating a computer system according to an embodiment of the present invention.

FIG. 7 illustrates a computer system 700 according to an embodiment of the present invention. Computer system 700 comprises a client computer 710 and a server computer 720 connected by a network 730. Network 730 may be any kind of network, such as a local area network or the internet. In an alternate embodiment, only a single client computing device may be needed.

Client computer 710 includes memory 711, CPU 712, input device 713, output device 714, and a network interface 715. Client computer 710 may be a personal computer, a tablet PC, a smartphone, a laptop computer, any other well-known computing device. Memory 711 may be a non-transitory medium storing instructions for executing any of the methods described above. Memory 711 may include RAM, a hard disk, a flash drive, or any other memory storage device that is well-known in the art. In some embodiments, memory 711 is used to store image files, metasets, digital data structures, program software for visual processing and visual search, or any other data desirable for running the methods described above. Memory 711 may include removable or portable memory devices, such as CDs, USB drives, external hard drives, etc. The instructions stored in memory 711 may be executed by CPU 712. Instructions may additionally or alternatively be processed by another processor of client computer 710 or another processor of a client-side device in communication with client computer 710. Users may provide input through input device 713, such as a keyboard, mouse, scanner, webcam, etc. Output, such as a semantic definition management editor or any other graphical user interface described above, may be displayed on output device 714, which may be a monitor. A network interface 715 allows for communication with server computer 720 over network 730. For example, a user at client computer 710 may transmit a visual search request to server computer 720 and receive results from the search request from server computer 720 over network 730.

Server computer 720 includes memory 721, CPU 722, and network interface 723. Memory 721 may include one or more databases for storing visuals and metasets describing the visuals. Memory 721 may store visual processing or visual search programs as instructions executable by CPU 722. Memory 721 may have a substantially larger capacity for storage than memory 711 of client computer 710. Similarly, CPU 722 may have substantially larger processing capacity than CPU 712 of client computer 710. CPU 722 may be configured to execute instructions for visual processing, visual search, or other requests, according to the methods described above, from various client computers in parallel. Server computer 720 may send the results of any processing over network 730 to client computer 710 or any other appropriate target.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A method of searching a metaset of semantic definition statements associated with visuals, the method being implemented by a computing device, the method comprising:
receiving search input via a computer interface;
deriving semantic expressions from the search input;
determining at least one type of semantic definition to apply to a search;
determining a metaset to apply to the search, the metaset comprising semantic definition statements representing semantic definitions;
performing the search based on the search input, the at least one type of semantic definition, and the metaset; and
outputting a list of visuals determined to have semantic relevance to the search input based on the search;
wherein the metaset is generated by:
receiving semantic definition statements as input, the semantic definition statements comprising:
semantic concept statements each comprising a semantic concept, a semantic concept operator of a set of semantic concept operators, and at least one semantic element or free text description having a semantic concept relationship with the semantic concept;
semantic context statements each defining a semantic context comprising a first semantic context operator and at least two of the semantic concepts having a semantic context relationship with each other; and
semantic inheritance statements each comprising:
a semantic inheritance operator comprising an inheritance level indicator or an inheritance direction indicator; and
a semantic inheritance operand comprising a semantic concept statement or a semantic context statement;
saving the received semantic definition statements in a metaset;
generating semantic definition statements through semantic inheritance using the received semantic definition statements, the generating the semantic definition statements comprising, for each of the semantic inheritance statements:
determining, based on one or more operators of the semantic inheritance operand, a related portion of the semantic inheritance operand and an inheritance portion of the semantic inheritance operand;
searching the metaset for related semantic definition statements based on the inheritance level indicator or the inheritance direction indicator, and the related portion of the semantic inheritance operand; and
for each of the related semantic definition statements, generating semantic definition statements comprising a portion of the related semantic definition statement and the inheritance portion of the semantic inheritance operand;
saving the generated semantic definition statements in the metaset;
associating the generated semantic definition statements with visuals through a semantic visual processing, wherein visuals comprising visual semantic attributes are associated with semantically related statements of the generated semantic definitions statements having semantic relationships with the visual semantic attributes;
converting the metaset into a digital data structure; and
storing the digital data structure in a memory storage device of a computing device.

2. The method of claim 1, wherein the set of semantic concept operators comprises a general semantic concept operator, a hypernym operator, a hyponym operator, a holonym operator, a meronym operator, a troponym operator, and a free text operator.

3. The method of claim 1, wherein at least one of the semantic context statements further comprises a second semantic context operator for associating at least one semantic element or free text description with a semantic context relationship.

4. The method of claim 1, wherein the semantic definition statements further comprise semantic marker statements each comprising a semantic marker operator and a semantic marker describing one of the semantic concept relationships or one of the semantic context relationships.

5. The method of claim 4, wherein the semantic definition statements further comprise semantic marker collection statements each comprising:
one of the semantic concepts;
a semantic marker collection operator; and
a group of the semantic markers, wherein each semantic marker of the group of semantic markers is found in at least one of the semantic marker statements comprising the one of the semantic concepts.

6. The method of claim 1, wherein the semantic definition statements further comprise semantic realm statements each comprising a semantic realm operator, a semantic realm, and:
at least one semantic element assigned to the semantic realm;
at least one semantic concept assigned to the semantic realm;
at least one semantic marker assigned to the semantic realm;
at least one other semantic realm assigned to the semantic realm; or
a semantic super-realm, wherein the semantic realm is assigned to the semantic super-realm.

7. The method of claim 1, wherein the semantic inheritance operator comprises an inheritance level indicator and an inheritance direction indicator.

8. The method of claim 1, wherein the semantic definition statements further comprise semantic instance statements each comprising a semantic element or one of the semantic concepts, a semantic instance operator, and at least one semantic instance of the semantic element or the one of the semantic concepts.

9. The method of claim 8, wherein the at least one semantic instance is selected from a single value, a plurality of non-exclusive values, a plurality of exclusive values, or a value indicating that the at least one semantic instance is undefinable.

10. The method of claim 8, wherein the semantic instance operator is a semantic instance internationalization operator defining a semantic instance of a semantic element or a semantic concept in a different language or a different writing system.

11. The method of claim 1, wherein the semantic definition statements further comprise lexical function statements comprising a semantic element or one of the semantic concepts, a lexical function operator, and at least one of a synonym, an antonym, a singular form, a plural form, or a word form variation of the semantic element or the one of the semantic concepts.

12. The method of claim 1, wherein at least one of the semantic definition statements comprises a semantic reference operator providing at least one reference for the at least one semantic definition statement.

13. The method of claim 1, wherein the semantic definition statements further comprise semantic internationalization statements each comprising a semantic element or one of the semantic concepts, a semantic internationalization operator, and a translation of the semantic element or the one of the semantic concepts into a different language or writing system.

14. The method of claim 1, wherein the metaset is associated with attributes comprising:
a title of the metaset;
a description of the metaset; or
semantics of the metaset configured as key:value pairs.

15. The method of claim 1, wherein the steps the received semantic definition statements are received as input and saved in the metaset using a semantic definition management editor, wherein the semantic definition management editor is further configured to create a new metaset, open a saved metaset, edit a metaset, save a metaset as under a new name, query a metaset, or search a metaset.

16. The method of claim 15, further comprising providing the semantic definition management editor with a pre-configured set of templates to assist in composing the semantic definition statements.

17. The method of claim 15, further comprising editing the metaset while using the metaset for visual processing.

18. The method of claim 15, wherein saving the semantic definition statements in the metaset triggers auto-recognition of the semantic definition statements by the semantic definition management editor.

19. The method of claim 15, wherein the semantic definition management editor is configured to compile a list of metasets, wherein the metasets in the list of metasets are selectable for use during composing of semantic definition statements, during visual processing, or during visual search.

20. The method of claim 19, wherein the list of metasets is published as a metaset library accessible outside of the semantic definition management editor, wherein the metasets of the metaset library are searchable by the attributes associated with the metasets.

21. The method of claim 1, further comprising:
determining more than one metaset to apply to the search.

22. The method of claim 1, wherein the search input is received from a user, the user has permissions or has selected a group of visuals, and the list of visuals corresponds to the permissions or the group of visuals.

23. The method of claim 1, wherein determining if a visual has semantic relevance to the search input comprises:
determining that each of the semantic expressions matches a semantic definition associated with the visual;
determining that each of a specified subset of the semantic expressions matches a semantic definition associated with the visual; or
determining that any of the semantic expressions matches a semantic definition associated with the visual.

24. The method of claim 1, wherein determining if a visual has semantic relevance to the search input comprises:
determining that a strict semantic search has been selected; and
determining that the visual has semantic relevance to the input only if the semantic expressions are determined to strictly match semantic definitions associated with the visual.

25. The method of claim 1, further comprising:
receiving a selection of at least one visual from the list of visuals or the search input; and
outputting semantic expressions associated with the at least one visual.

26. The method of claim 1, further comprising selecting semantic definitions from the metaset, comprising:
retrieving semantic definition statements from the metaset wherein each of the retrieved semantic definition statements comprises a subject operand and an object operand;
outputting a set of semantic expressions based on the retrieved semantic definition statements, wherein the semantic expressions comprise selectable items corresponding to the subject operand or the object operand;
receiving a selection of the selectable items; and
determining selected semantic definitions based on the set of semantic expressions and the selection.

27. The method of claim 26, further comprising filtering the metaset based on the selected semantic definitions.

28. The method of claim 26, further comprising outputting an updated set of semantic expressions based on the selected semantic definitions.

* * * * *